United States Patent [19]

Folsom et al.

[11] 4,162,196

[45] Jul. 24, 1979

[54] ADAPTOR COLLAR

[75] Inventors: Max H. Folsom, Portland, Oreg.; Michael D. Dickman, Philadelphia, Pa.

[73] Assignee: National Appliance Company, Portland, Oreg.

[21] Appl. No.: 744,611

[22] Filed: Nov. 24, 1976

[51] Int. Cl.[2] .............................................. C12K 1/10

[52] U.S. Cl. .............................................. 435/313; 312/1; 435/809

[58] Field of Search .............................. 195/127; 312/1

[56] References Cited

U.S. PATENT DOCUMENTS 4,062,652 12/1977 Rolfo-Fontana ................ 195/127 X

FOREIGN PATENT DOCUMENTS 1146767 3/1969 United Kingdom ........................ 312/1

*Primary Examiner*—Raymond N. Jones
*Assistant Examiner*—Robert J. Warden
*Attorney, Agent, or Firm*—Klarquist, Sparkman, Campbell, Leigh, Hall & Whinston

[57] ABSTRACT

An adaptor collar which can be joined to a standard laboratory jar for the purpose of maintaining a constant anaerobic atmosphere inside of the jar is disclosed. The combined adaptor collar and jar form a transport unit suitable for the transport of anaerobes from remote locations to a controlled atmosphere incubation apparatus. The adaptor collar is adapted to dock with the incubation apparatus so that anaerobes can be transferred from the jar to the interior of the apparatus without exposure to the air.

13 Claims, 4 Drawing Figures

ADAPTOR COLLAR

BACKGROUND OF THE INVENTION

The present invention relates to an apparatus for maintaining controlled environment. It is especially concerned with an incubation apparatus for the growth of anaerobes and with the process for transfer of such organisms to and from such an apparatus.

To provide for the safe and efficient transport and incubation of anaerobes, we have previously devised a controlled atmosphere incubation apparatus and transport system which is described in our copending application Ser. No. 693,624, filed June 7, 1976 now U.S. Pat. No. 4,111,753.

SUMMARY OF THE INVENTION

The present invention relates to an adaptor collar which can be joined to standard laboratory jar to thereby equip such a jar with a gas circulation system so that the combined jar and collar can be used as a transport unit to transport anaerobic micro-organisms from a remote location to an incubator. The adaptor collar also is adapted to dock with an incubation apparatus of the type shown in our copending application so that anaerobic specimens can be transferred from the jar into the incubation apparatus without exposure to air or transfer through an evacuative type airlock.

Specimens collected at remote locations are placed in the jar, and the jar clamped to the adaptor collar to form the transport unit. The interior of the transport unit is continuously flushed with an anaerobic gas mixture at pressures above atmospheric to displace oxygen-bearing gases while the transport unit, with a culture of anaerobic specimens enclosed, is transported to the incubator. After the transport unit is docked with the incubator, specimens are transferred to the incubator without exposure to the surrounding atmosphere.

The adaptor collar is inexpensive and is constructed of lightweight material. Because standard laboratory glassware jars are docked with the adaptor collar, the collar can be reused immediately after specimens are transferred to the incubation chamber simply by substitution of a new jar.

It is an object of the present invention to provide an improved transport unit which is adapted to dock with an incubator so that the specimens may be transferred directly to the incubation chamber without the exposure to air.

An additional object is to provide an improved transport unit in which a flow of any desired gas moves continuously through the container during transport and which can accommodate anaerobic specimens in standard laboratory jars.

Another object is to provide a transport unit which is inexpensive, lightweight and constructed from a minimum number of parts.

Other objects will become apparent from the following description.

DESCRIPTION OF THE PREFERRED EMBODIMENT

Figure 1:
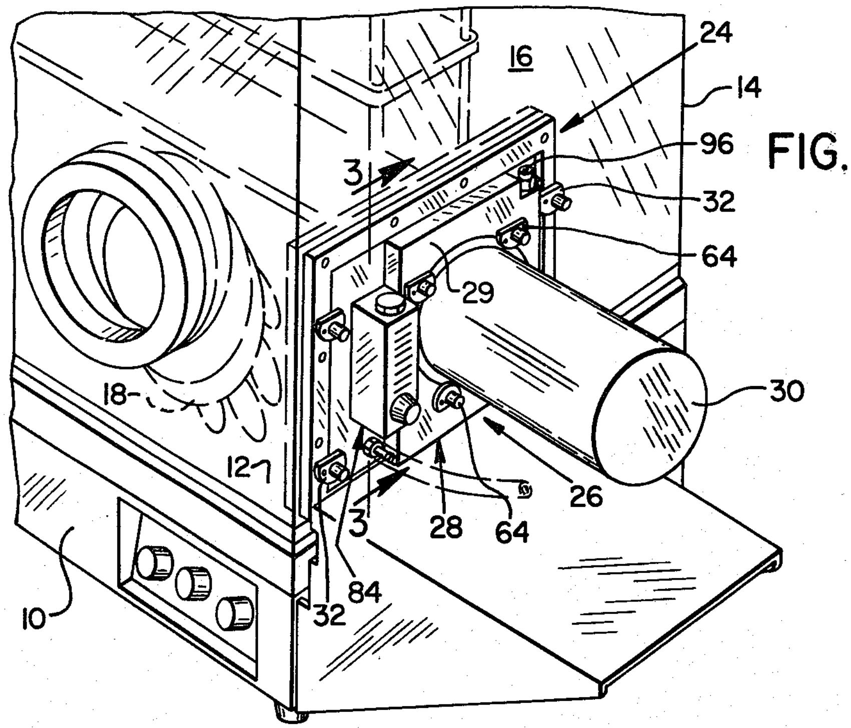
FIG. 1 is a perspective view of the transport unit of the present invention docked with a controlled atmosphere incubation apparatus.

The adaptor collar of the present invention is adapted to dock with a controlled atmosphere apparatus of the type shown in FIG. 1. This apparatus includes a base 10 of a rigid boxlike construction having an upper wall 12 which serves as a floor for the chamber. Mounted on the base 10 is a hood 14 preferably made of a transparent flexible material such as a clear vinyl plastic film and preferably comprising a plurality of walls joined by airtight seams. The hood 14 and base 10 are joined with an airtight seal so that together they define an airtight incubation chamber 16 to contain the usual glassware and other equipment for the culture of microbes. The apparatus of FIG. 1 includes a variety of pressure, temperature and gas circulation regulating equipment to maintain a constant atmosphere inside the chamber 16. Elevated pressures are maintained inside the chamber so that the hood is inflated and thus self-supporting during normal operation. Mounted on the walls of the hood 14 are plastic gloves 18 or other similar remote handling means and door frame 24 on which is hung a sealable chamber door means operable to admit specimens into the chamber. If the apparatus is being used for the incubation of anaerobes, the chamber door means is not normally opened directly to the atmosphere, but if it is accidentally opened, air will not pass into the chamber because anaerobic gases inside the chamber are maintained at a pressure greater than atmospheric and thus will flow out of the door displacing the surrounding air. The outwardly facing side of the door frame 24 is adapted to receive a transport unit 26 which includes an adaptor collar 28 having a main frame member 29, preferably made of a lightweight, transparent plastic material, and a standard laboratory receptacle 30. The adaptor collar 28 and receptacle 30 together define a transport chamber inside the receptacle for containing specimens during transport to the incubation chamber 16.

When docked together, the door frame 24 and the adaptor collar 28 form an airlock means which includes an airlock compartment between the incubation chamber door means and the adaptor collar so that the incubation chamber door means may be opened without exposing the incubation chamber to the surrounding atmosphere. The adaptor collar 28 is maintained in the docked position by clamps 32.

Figure 3:
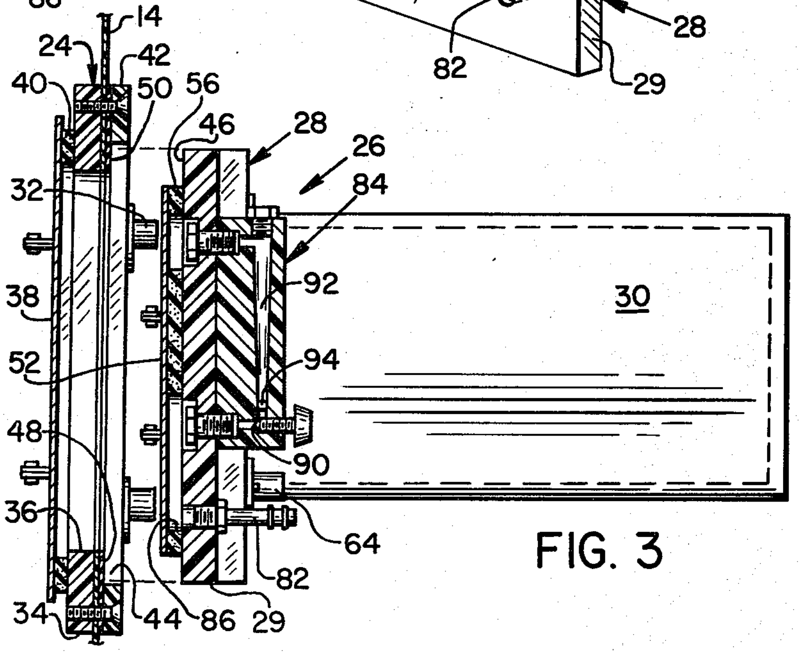
FIG. 3 includes vertical sectional views of the transport unit and of the door mechanism of the controlled atmosphere apparatus taken along line 3—3 of FIG. 1.

More detailed views of the door frame 24 and transport unit 26 appear in FIG. 3. This figure shows an inner clamp frame 34 which is mounted on the hood 14 and which defines an opening 36 of dimensions no smaller than the inside diameter of the receptacle 30 so that the entire contents of the receptacle 30 can slide through the opening 36 and into the chamber 16. Hinged to the inner clamp frame 34 is a sealable chamber door 38 to close the opening 36. The door includes a gasket 40 to insure that an airtight seal is formed between the door 38 and the frame 34 and also includes a chamber door latch (not shown) operable from the inside of the chamber 16 to hold the door in a closed position.

Opposite the inner clamp frame 34 on the outside of the hood 14 is an outer clamp frame 42 defining an opening 44 which is larger than the opening 36 and slightly larger than a clamping surface 46 which comprises one surface of the adaptor collar main frame member 29. The inner and outer clamp frames 34, 42 are aligned such that a clamping shoulder 48 peripheral to the opening 36 is formed by the inner clamp frame 34. A gasket 50, located between the inner and outer clamping frames 34, 42 and extending to the periphery of the opening 36, forms a seal between the clamping surface 46 and the shoulder 48 when the adaptor collar 28 is docked with the door frame 24 to form an airlock means.

Figure 2:
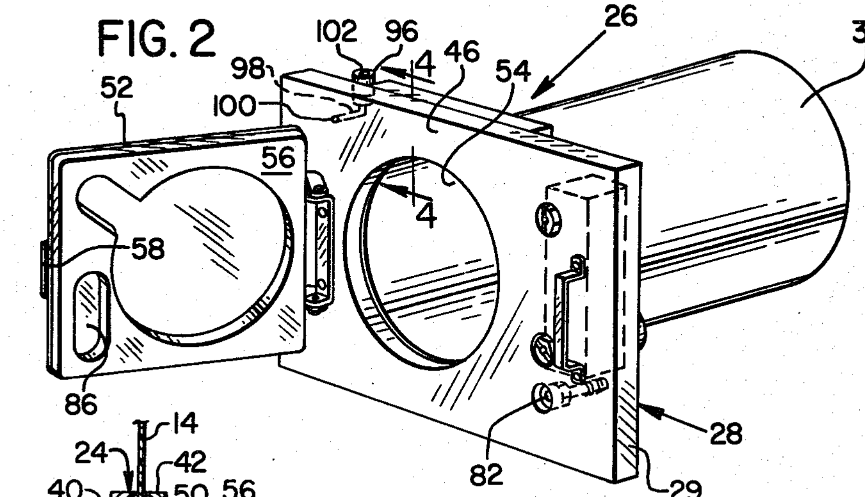
FIG. 2 is a perspective view showing the transport unit standing alone with its door in an open position.

Hinged on the clamping surface 46 is an adaptor collar door 52, smaller than the opening 36, to close a passageway 54 (FIG. 2) defined by the clamping surface 46. The passageway 54 is preferably no smaller than the interior of the receptacle 30 and more preferably is of the same size and shape as the interior. The door 52 is provided with a gasket 56 so that the door, when in a closed position, is an airtight closure. An adaptor collar door latch 58, operable from the inside of the chamber 16 when the adaptor collar 28 is docked and the chamber door 38 is opened, is provided to hold the door 52 in the closed position.

Figure 4:
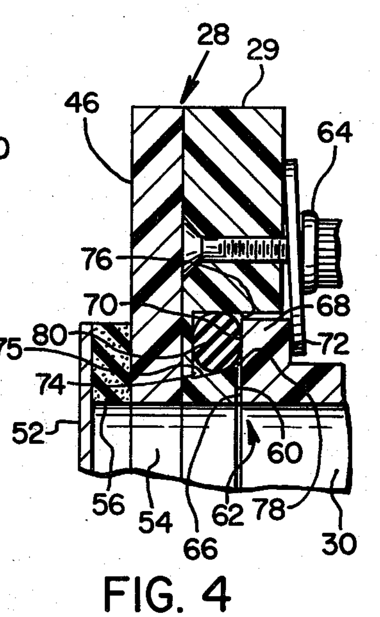
FIG. 4 is a sectional view taken along line 4—4 of FIG. 3.

On the side of the main frame member 29 opposite the clamping surface 46 is a receptacle receiving surface 60 (FIG. 4). The surface 60 extends around the circumference of the central passageway 54 and is preferably a planar surface which is adapted to abut a mouth portion 62 of the receptacle 30. Clamps 64 are provided to secure the mouth portion 62 in a position of abutment with the receptacle receiving surface 60.

In the illustrated embodiment of the present invention the receptacle 30 comprises a standard BBL laboratory jar produced by Becton, Dickinson & Co., Rutherford, N.J. The mouth portion 62 of such a jar includes a rim 66 defining the mouth of the receptacle and a peripheral flange 68 which extends outwardly of the receptacle from a position adjacent the rim 66. The flange has a first surface 70 which faces in the same direction as the rim 66 and a second or clamp-engaging surface 72 which faces in the opposite direction. The rim 66 and first surface 70 conform in size and shape to the planar receptacle receiving surface 60.

The main frame member 29 defines a groove 74 in the receptacle receiving surface 60 which groove extends around the entire circumference of the passageway 54 and has side walls 75, 76 which diverge inwardly from a groove opening 78 in the surface 60. A resilient, elongated bead 80 of uniform cross-sectional area is enclosed inside the groove 74. Because the walls 75, 76 diverge inwardly and because the groove opening 78 is smaller than the diameter of the bead 80, the bead is retained in position inside the groove with only a small portion of the bead extending outside of the groove 74, above the receptacle receiving surface 60.

When the receptacle 30 is docked with the adaptor collar 28 as shown in FIG. 4, the mouth portion 62 contacts that portion of the bead 80 which is above the receptacle receiving surface 60 to form an airtight seal between the bead 80 and the mouth portion 62. In the illustrated embodiment of the present invention, the first surface 70 of the flange 68 is in contact with the bead 80, and D-ring clamps 64, mounted on the main frame member 29, engage the second surface 72 of the flange 68 thereby maintaining the first surface 70 in contact with the bead 80.

When the transport unit 26 is docked with the door frame 24 as shown in FIG. 1 and both of the doors 38, 52 are closed, the adaptor collar door 52 is opposed to the chamber door 38 and an airlock compartment is formed between the doors. Because an airtight seal is formed between the clamping surface 46 and the door frame 24, the doors may be opened and specimens transferred through the airlock compartment without exposure to the outside atmosphere. The doors are opened in two steps: First, the chamber door 38 is unlatched and swung into open position inside the chamber. Second, adaptor collar door 52 is unlatched and swung into an open position inside the chamber. With both door means in the open position, the transfer of specimens can commence.

The adaptor collar 28 also includes a gas circulation system which allows gas to pass through the interior of the receptacle 30 at greater than atmospheric pressure when the adaptor collar door 52 is closed. Gas from a pressurized source (not shown) is introduced through a gas inlet 82 mounted on the main frame 29 and delivered to a flow meter 84 via a notch 86 in the gasket 56. The cross-sectional view of the flow meter (FIG. 3) shows a valve 90 provided as a flow regulator means for controlling the flow of gaseous medium into the receptacle 30. Gas passing through the valve rises through a tube 92 and flows into the interior of the receptacle 30. The gas flow rate is indicated by the level to which a floating ball 94 rises in the tube 92.

Normally, when the door 52 is in a closed position, an airtight seal is formed between the gasket 56 and the clamping surface 46. The latch 58 is, however, set to allow gas to seep out between the gasket 56 and the clamping surface 46 when the pressure inside the receptacle 30 exceeds atmospheric pressure by a predetermined amount. The adaptor collar door 52 thus acts as a one-way valve allowing gas to discharge from the receptacle 30, but preventing air from flowing back into the receptacle. When the transport unit 26 is docked to the door frame 24, the door 52 is positioned such that gas leaving the receptacle 30 between the gasket 56 and the clamping surface 46 enters the airlock compartment between the doors 38 and 52. In order to discharge gas from the airlock compartment and to maintain a steady, elevated pressure inside that compartment, the adaptor collar 28 is provided with a one-way pressure activated valve 96 connected to a passageway 98 through the main frame member 29. Gas from the airlock compartment passes through an inlet orifice 100 in the clamping surface 46 and into the passageway 98. The gas next passes through the one-way valve 96 and from there it is discharged to the surrounding atmosphere through an outlet orifice 102.

When a specimen at a remote location is to be transferred to the controlled atmosphere apparatus chamber the procedure is as follows: First, the specimen is placed inside the receptacle 30. A stream of a desired gas mixture is directed from a hand held hose into the receptacle 30 to flush air from its interior; and the adaptor collar 28, with its door 52 in the closed position, is then clamped to the receptacle 30. Next a portable tank (not shown) of the desired gas mixture is connected to the inlet 82; and the valve 90 is opened to admit the gas mixture to the interior of the receptacle 30 via the tube 92. Nitrogen or a mixture of nitrogen and other anaerobic gases are suitable gases if the specimen consists of anaerobes. An appropriate gas flow rate is set according to the flow meter 84 by adjusting the valve 90; and the gas mixture is continuously passed the portable tank and through the interior of the receptacle 30 until such time as the material can be transferred to the chamber 16. During transmit from a remote location to the chamber 16, the portable gas tank and transport unit 26 are carried together so that the flow of the desired gas mixture through the interior of the receptacle 30, is uninterrupted. The gas mixture is automatically vented from the transport unit by escaping between the gasket 56 and the clamping surface 54 as previously described.

To transfer specimens from the transport unit 26 to the chamber 16, the transport unit is docked as shown in FIG. 1 and secured by the clamps 32 to form the airlock compartment between the doors 38, 52. After docking the valve 90 is adjusted so that the flow rate of gas into the receptacle 30 is reduced to an amount no greater than the maximum flow rate allowed by the valve 96. As previously described the valve 96 vents the airlock compartment between the doors 38, 52 to the atmosphere. The flow of gas through the airlock compartment is allowed to continue for about five minutes or so long as necessary to expel oxygen trapped in the airlock compartment. After a sufficient passage of time, valve 90 may be closed to stop the flow. Next the doors 38, 52 are opened from the inside of the chamber 16, and the specimen is transferred from the interior of the receptacle 30 to the chamber 16 without disturbing the atmosphere inside that chamber.

The transport unit 26 is removed by closing both doors 38, 52, unfastening the clamps 32 and removing the transport unit 26.

While we have shown and described a preferred embodiment of our invention it will be apparent to those skilled in the art that changes and modifications may be made without departing from our invention in its broader aspects.

We claim:

1. An adaptor collar which attaches to a receptacle to form a portable transport unit for transporting objects between remote locations and an airtight controlled atmosphere chamber and for maintaining objects in a controlled atmosphere during transporting comprising:

a main frame member having a clamping surface, a receptacle receiving surface adapted to detachably receive the mouth of a jar-like receptacle and a central passageway extending through said main frame member from said clamping surface to a position on said receptacle receiving surface where said passageway will register with the mouth of a receptacle received by said recepticle receiving surface;

door means, on said clamping surface, repeatedly alternately positionable between a closed position, wherein said central passageway is blocked, and an open position, wherein objects may be passed through said passageway; and inlet means adapted to admit a stream of gaseous medium into said passageway at a point between said door means and said receptacle receiving surface.

2. An adaptor collar of claim 1 wherein said clamping surface is dimensioned to mate with the door frame of an airtight incubation chamber.

3. An adaptor collar of claim 1:

wherein said receptacle receiving surface is dimensioned to receive and dock with the mouth portion of a receptacle; and further comprising clamp means cooperable with said main frame member to maintain the mouth portion of such a receptacle in contact with said receptacle receiving surface.

4. An adaptor collar of claim 3 further comprising:

an airtight receptacle having a rim which defines a receptacle mouth and a peripheral flange extending outwardly from said receptacle at a position adjacent said rim;

said flange having a clamp engaging surface which faces in a direction opposite said rim;

said clamp means being positioned to exert pressure on said clamp-engaging surface and thereby to hold said receptacle in contact with said receptacle receiving surface.

5. An adaptor collar of claim 1 wherein said inlet means comprises a flow meter to regulate the flow rate of said stream of gaseous medium.

6. An adaptor collar of claim 1 further comprising:

an exhaust passageway extending through said frame from an inlet orifice defined in said clamping surface; and a pressure activated one way valve connected to said exhaust passageway so that gas can move through said exhaust passageway only in a direction away from said clamping surface.

7. An adaptor collar of claim 1 wherein said door means, when positioned to close said passageway, contacts said clamping surface to form a substantially airtight seal therewith.

8. An adaptor collar of claim 7 wherein said door means, when positioned to close said passageway, will allow gas inside said passageway to escape between said door means and said clamping surface if the atmospheric pressure inside said passageway exceeds the atmospheric pressure on the other side of the door means by a predetermined amount.

9. An adaptor collar of claim 1 wherein:

said receptacle receiving surface conforms in shape and size to the mouth portion of a receptacle to be received thereby and;

said frame member defines a groove in said receptacle receiving surface, which groove extends inwardly from a groove opening which is disposed around the circumference of said receptacle receiving surface;

an elongated bead of resilient material is positioned inside said groove and extends a short distance outside said groove, above said receptacle receiving surface to contact a mouth portion of a receptacle; and clamp means are provided on said main frame to urge a mouth portion of a receptacle against said bead when such a receptacle is positioned to abut said bead.

10. An adaptor collar of claim 9 wherein said groove has side walls which diverge inwardly from said groove opening;

said groove opening being narrower than the diameter of said bead so that said bead is retained in said groove by said walls.

11. A controlled atmosphere apparatus comprising:

incubation means having walls which define an airtight chamber, one of said walls having a door opening therethrough and a sealing chamber door means mounted thereon to close said opening;

a main frame member defining a central passageway therethrough and having a main frame door means repeatedly alternately positionable to close and to open said passageway;

said main frame being adapted to couple with said incubation means in a docked relationship whereby one end of said passageway is positioned opposite said door opening;

clamp means for maintaining said incubation means and said main frame member in said docked relationship;

a receptacle which defines an interior cavity and is adapted to couple with said main frame member at the other end of said passageway in a detachably docked relationship to form a portable transport unit which defines an airtight transport chamber including both the volume inside said cavity and the volume inside the portion of said passageway between said main frame door means and said other end of said passageway;

easily releaseable clamp means for temporarily maintaining said receptacle and said main frame member in said docked relationship; and gas circulation means on said frame, including inlet and outlet means, for supplying a continuous stream of gas to the interior of said transport chamber including the volume inside said cavity while said main frame door means is positioned to close said passageway.

12. An apparatus of claim 11 wherein:

when said main frame is docked with said incubation means, an airlock compartment is formed therebetween so that articles may be transferred between said transport chamber and said airtight chamber through said door opening without admitting gas from the surrounding atmosphere;

said gas circulation means is adapted for circulating a selected gaseous medium through said transport chamber to displace any residual gas therein and to establish a selected atmosphere therein by introducing selected gaseous medium into said transport chamber via said inlet means and simultaneously exhausting gaseous medium from said transport chamber via a separate outlet means; and said apparatus further comprises means for circulating a selected gaseous medium through said airlock compartment:

a. wherein said outlet means is positioned such that gaseous medium exhausted from said transport chamber passes into said airlock compartment when said main frame is docked with said incubation means and said main frame door means is closed, and b. including means for exhausting said gaseous medium from said airlock compartment to the surrounding atmosphere so that any residual air trapped in said compartment as a result of docking of said main frame to said incubation means can be displaced, through said means for exhausting, simultaneously with the admission of said selected gaseous medium into said airlock compartment via said outlet means, prior to the transfer of an atmosphere-sensitive article between said airtight chamber and said transport chamber.

13. An adaptor collar which attaches to a receptacle to form a portable transport unit for transporting objects between remote locations and an airtight controlled atmosphere chamber and for maintaining objects in a controlled atmosphere during transporting comprising:

a main frame member having a clamping surface dimensioned to mate with the door frame of an airtight incubation chamber, a receptacle receiving surface dimensioned to receive and dock with the mouth portion of a receptacle and a central passageway extending through said main frame member from said clamping surface to said receptacle receiving surface;

clamp means positioned on said main frame member and adapted to maintain the mouth portion of such receptacle in contact with said receptacle receiving surface such that, when docked, the opening defined by the receptacle's mouth portion communicates with said passageway;

door means, on said clamping surface, repeatedly alternately positionable between an open position wherein objects may be passed through said passageway and a closed position wherein said door means contacts said clamping surface and thereby forms a substantially airtight seal therewith to close said central passageway whereby, when said door means is in said closed position, said frame comprises a substantially airtight closure for the mouth portion of such a container; and inlet means adapted to admit a stream of gaseous medium into said passageway at a point between said door means and said receptacle receiving surface;

said door means, when positioned to close said passageway, being responsive to the pressure of gas inside said passageway so that gas inside said passageway can escape between said door means and said clamping surface if the atmospheric pressure inside said passageway exceeds the atmospheric pressure on the other side of the door means by a predetermined amount.

* * * * *